(12) United States Patent
Son et al.

(10) Patent No.: US 6,240,212 B1
(45) Date of Patent: May 29, 2001

(54) SCAN INTERLEAVING METHOD

(75) Inventors: Se-hoon Son, Seoul; Euee-seon Jang, Sungnam; Jae-seob Shin, Seoul, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/045,867

(22) Filed: Mar. 23, 1998

(30) Foreign Application Priority Data

Jun. 19, 1997 (KR) .................................................. 97-25784

(51) Int. Cl.[7] ...................................................... G06K 9/36
(52) U.S. Cl. ............................ 382/243; 382/239; 382/242
(58) Field of Search .................................... 382/239, 242, 382/243, 197; 358/426; 348/700, 7.1, 26–28, 597, 6.6, 625, 97; 345/240.24, 240.25, 240.26, 240.29, 240.21

(56) References Cited

U.S. PATENT DOCUMENTS

| 4,845,561 | * | 7/1989 | Doyle et al. | 348/424.1 |
| 4,914,520 | * | 4/1990 | Beard | 348/97 |
| 5,850,264 | * | 12/1998 | Agarwal | 348/469 |

FOREIGN PATENT DOCUMENTS

0607484A1  7/1994 (EP) .

OTHER PUBLICATIONS

Bossen et al., "A Simple and Efficient Binary Shape Coding Technique Based On Bitmap Representation," 1997 *Institute of Electrical and Electronics Engineers*, Apr. 21, 1997, pp. 3129–3132.

Ebrahimi, Touradj, "MPEG–4 video verification model: A video encoding/decoding algorithm based on content representation," *Signal Processing: Image Communication*, 1997, pp. 367–384.

Lee et al., "An Efficient Encoding of DCT Blocks with Block–Adaptive Scanning," *IEICE Transactions on Communications*, vol. E77–B, No. 12, Dec. 1994, pp. 1489–1494.

* cited by examiner

Primary Examiner—Cheukfan Lee
(74) Attorney, Agent, or Firm—Burns, Doane, Swecker & Mathis, LLP

(57) ABSTRACT

There is provided an improved scan interleaving method suitable for multipurpose encoding of binary image data, and for selectively encoding a part or the whole of object image data according to presence or absence of exceptional sampling data (ESD). In the present invention, when the pixel data of base image data and the corresponding pixel data of the object image data to be scan-interleaved are the same (in the case of predictive sampling data), no encoding is performed on the pixels of the object image data which have no ESD, thus simplifying the algorithm and system implementation. As a result, the overall encoding performance can be improved.

11 Claims, 5 Drawing Sheets

→ PROCESSED FIRST
--→ PROCESSED SECOND

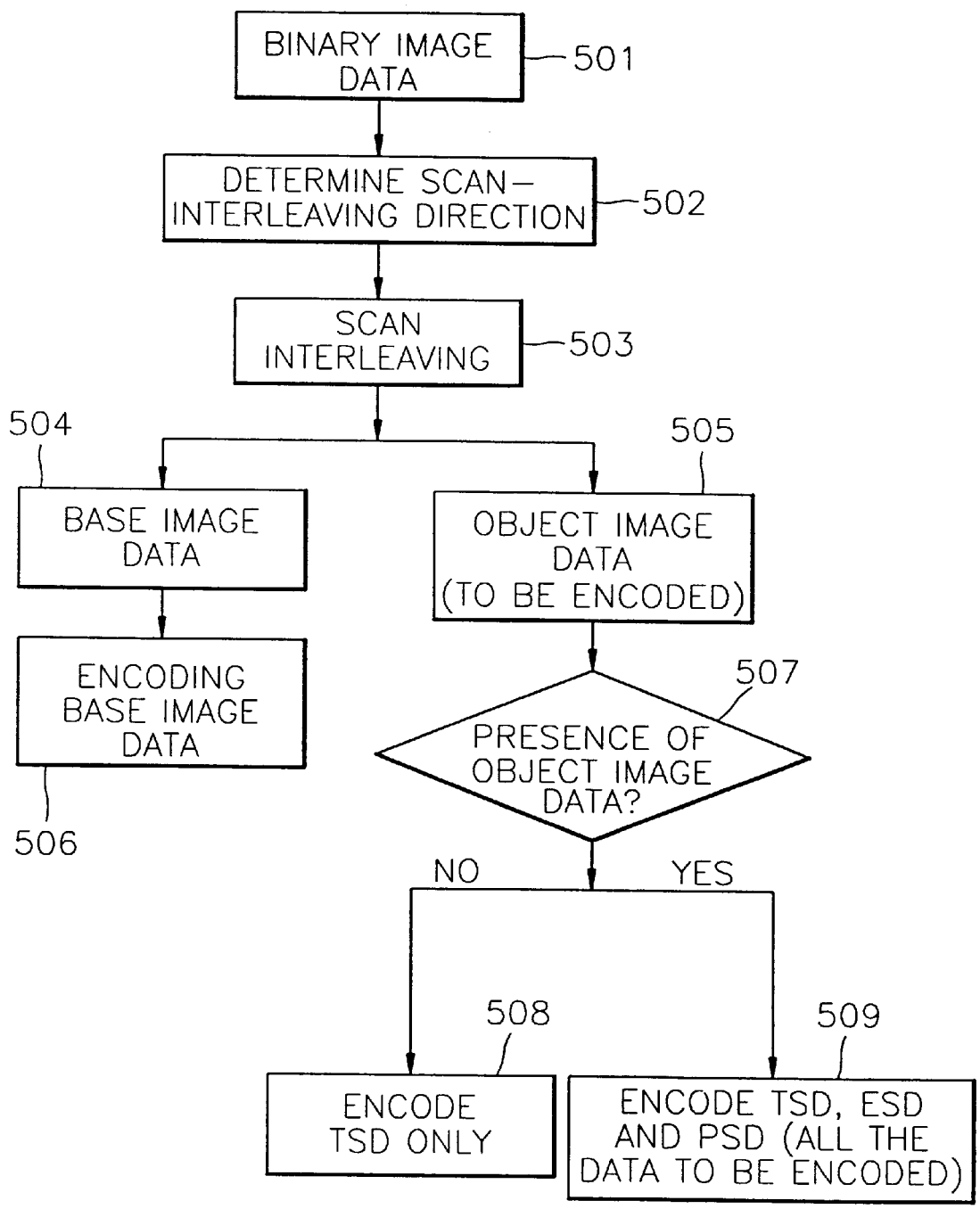

SCAN INTERLEAVING METHOD

This application claims priority under 35 U.S.C. §§119 and/or 365 to Application No. 97-25784 filed in Korea on Jun. 19, 1997; the entire content of which is hereby incorporated by reference.

BACKGROUND OF THE INVENTION

1. Field of the Invention

The present invention relates to a scan interleaving method suitable for multipurpose encoding of binary images, and more particularly, to an improved scan interleaving method for selectively encoding a part or the whole of object image data according to the presence or absence of exceptional sample data (ESD).

2. Description of the Related Art

A scan interleaving method has been used to encode binary images in various applications such as adjustment of resolution or image quality, encoding to resist transmission errors, or transmission rate adjustment.

FIG. 1 illustrates a conventional concept of an encoder and a decoder. In FIG. 1, an encoder 11 encodes input image data, and sends a resulting bit stream. A decoder 15 extracts image data from the transmitted bit stream.

But, the encoder 11 shown in FIG. 1 generates a great number of bits, thus increasing system complexity. This problem becomes serious in multipurpose encoding of binary images.

To overcome this problem, a so-called scan interleaving method is used, in which shape data is encoded through an XOR operation on adjacent scanning lines.

FIG. 2 is a view for illustrating a conventional scan interleaving method. In FIG. 2, reference numeral 200 denotes original shape data, reference numeral 210 denotes base image data, and reference numeral 220 denotes the image data to be encoded which is called object image data.

The base image data is composed of pixels on even (or odd) numbered scanning lines among pixels forming the original shape data 200.

The object image data 220 is composed of pixels on odd (or even) numbered scanning lines among the pixels forming the original shape data 200, and includes transitional sample data (TSD), ESD, and predictive sample data (PSD).

The TSD (the reference numeral 230) is the pixels marked by rectangles in the object image data 220 shown in FIG. 2, and indicates that pixels on a current scanning line is the same as only one of the corresponding pixels on previous and following scanning lines. For example, the third pixel from the left on the first scanning line of the object image data 220 is different from only one of the third pixels from the left on the first and second scanning lines of the base image data 210. Thus, the TSD in this case is "1". This is obtained by performing an XOR operation on the pixel on the current scanning line with the corresponding pixel of the previous line, then, an XOR operation on the pixel of the current line with the corresponding pixel of the following line, and finally an XOR operation on the two XOR results.

The ESD (the reference numeral 240) is the circled pixels in the object image data 220, and indicates that a pixel on the current scanning line is different from both of the corresponding pixels of the previous and following scanning lines. For example, the third pixel from the right of the first scanning line in the object image data 220 is different from both of the third pixels from the right of the first and second scanning lines in the base image data 210. Thus, the ESD in this case is "0" by performing an XOR operation on the third pixel from the right on the current scanning line with the corresponding pixel of the previous line, then, an XOR operation on the pixel of the current line with the corresponding pixel of the following line, and finally an XOR operation on the two XOR results.

PSD are all the pixels except TSD (230) and ESD (240) in object image data (220).

In the scan interleaving method, the base image data is independently encoded from the object image data. In encoding the object image data, a pixel context value is achieved from the neighboring condition in consideration of adjacent pixels, and the object image data is entropy-encoded based on a probability model dependent on pixel context value.

The ESD is divided into continuous data and noncontinuous data, and then encoded. In the latter, the pixel predition probability of the context and the occurrence run of the value of the ESD are entropy-encoded. In the former, the pixel predition probability of the context and the continuous segments of the successive ESD are encoded.

However, the conventional scan interleaving method performs TSD encoding and ESD encoding in two separate steps, thus increasing the algorithm complexity and making implementation difficult.

In addition, the overall encoding performance is decreased due to encoding the ESD.

SUMMARY OF THE INVENTION

To solve the above problems, it is an object of the present invention to provide an improved scan interleaving method for selectively encoding a part or the whole of object image data according to presence or absence of ESD.

It is another object of the present invention to provide an improved scan interleaving method for increasing the overall coding efficiency by determining an optimum scan interleaving direction.

To achieve the above first object, there is provided a scan interleaving method for obtaining base image data and object image data to be encoded including TSD, ESD, PSD by scan-interleaving binary image data, and encoding the obtained base image data, and object image data which includes TSD, ESD and PSP, comprising the steps of:

(a) receiving the binary image data;
(b) scan-interleaving the received binary image data;
(c) obtaining the base image data from the scan-interleaving result;
(d) obtaining the object image data from the scan-interleaving result;
(e) encoding the base image data;
(f) determining whether the object image data includes ESD;
(g) encoding TSD when there is no ESD; and
(h) encoding TSD, ESD, and PSD when there is ESD.

To achieve the second object, there is provided a scan interleaving method for obtaining base image data and object image data including TSD, ESD, and PSD by scan-interleaving binary image data, and encoding the obtained base image data, TSD, ESD, and PSD, comprising the steps of:

(a') receiving the binary image data;
(b') determining a scan interleaving direction for the received binary image data;
(c') scan interleaving the received binary data in the determined scan interleaving direction;

(d') obtaining the base image data from the scan-interleaving result;

(e') obtaining the object image data from the scan-interleaving result;

(f') encoding the base image data in an encoding method;

(g') determining whether the object image data includes ESD;

(h') encoding TSD when there is no ESD; and (I') encoding the TSD, ESD, and PSD when there is ESD.

BRIEF DESCRIPTION OF THE DRAWINGS

The above objects and advantages of the present invention will become more apparent by describing in detail preferred embodiments thereof with reference to the attached drawings in which:

FIG. 5 is a flowchart of a scan interleaving method according to another embodiment of the present invention.

DESCRIPTION OF THE PREFERRED EMBODIMENTS

Figure 3:
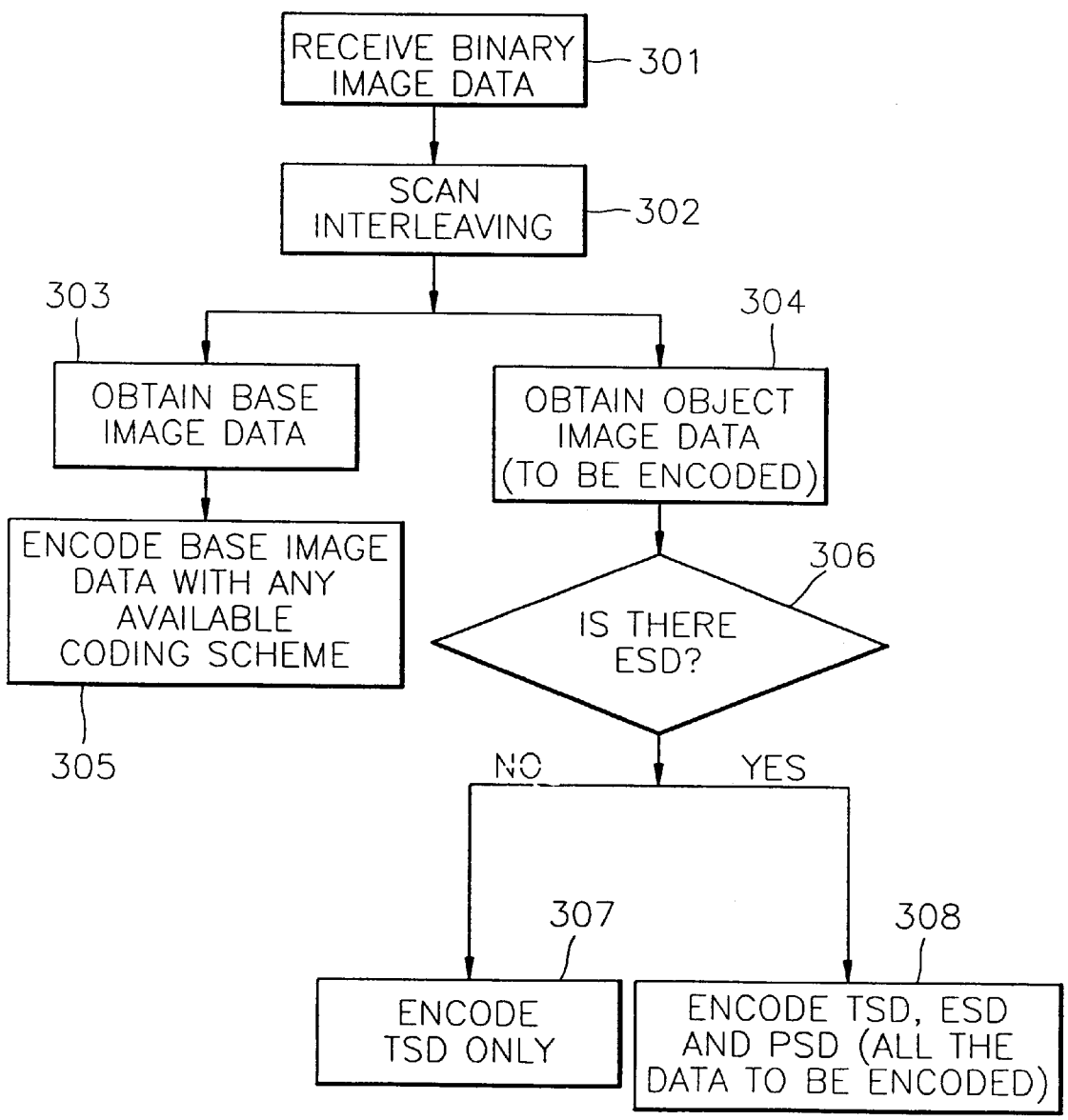
FIG. 3 is a flowchart of a scan interleaving method according to an embodiment of the present invention.

The method shown in FIG. 3 includes the steps of: (301) receiving binary image data; (302) scan-interleaving the received binary image data; (303) obtaining base image data from the scan-interleaved result; (304) obtaining object image data from the scan-interleaved result; (305) encoding the base image data obtained in step (303); (306) determining whether the object image data obtained in step (304) has ESD; (307) encoding TSD when there is no ESD; and (308) encoding the TSD, ESD and PSD when there is the ESD.

The scan interleaving method shown in FIG. 3 will be described.

In step (301), binary image data is received.

Figure 1:
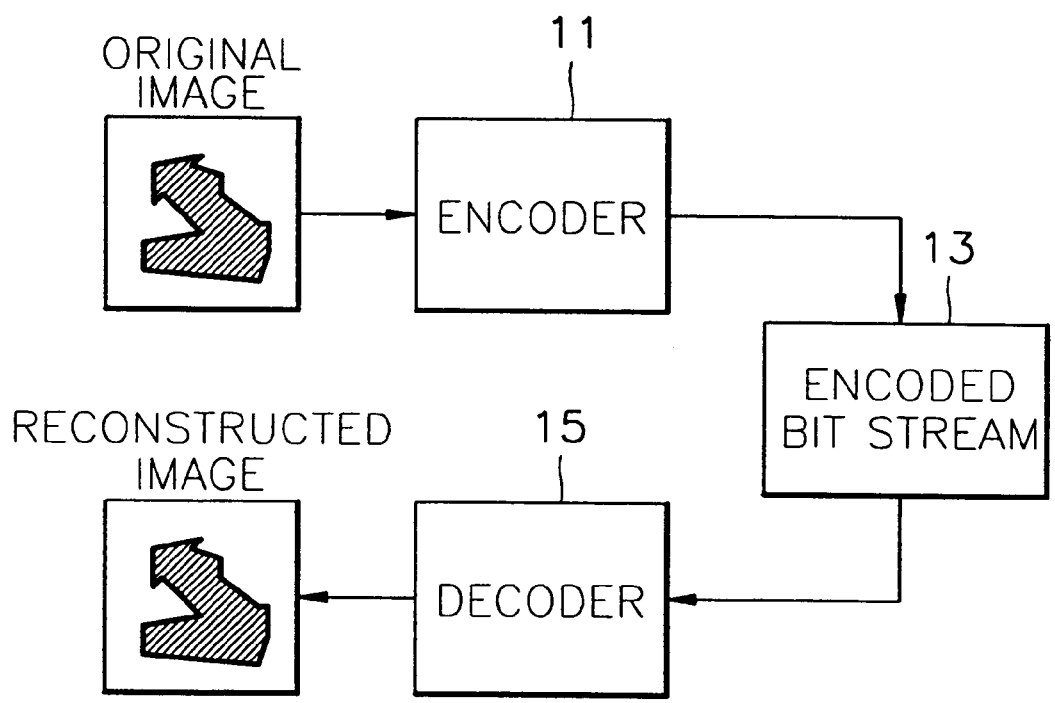
FIG. 1 illustrates a conventional concept of a shape encoder and decoder.
Figure 2:
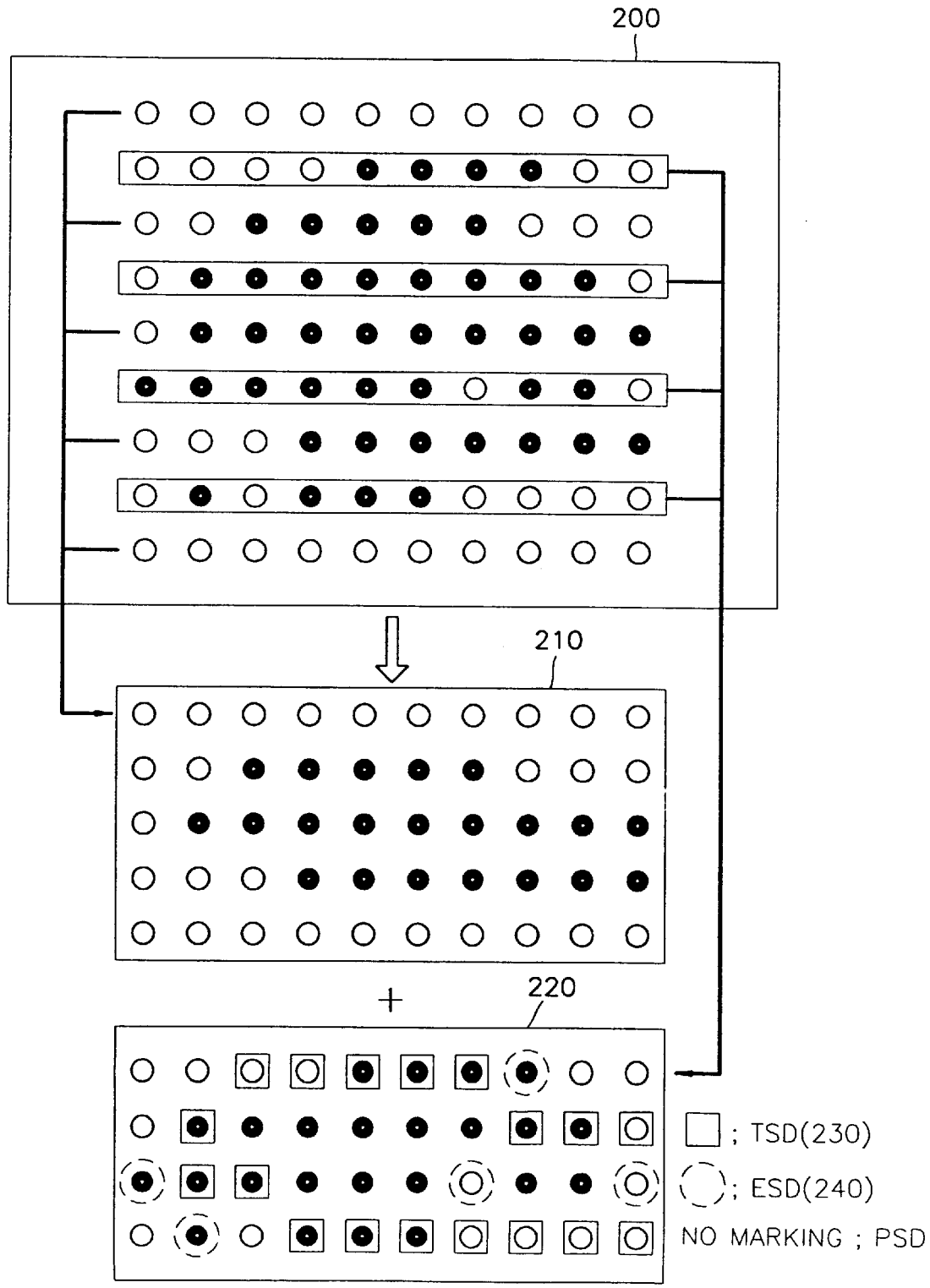
FIG. 2 illustrates a conventional scan interleaving method.

In step (302), the received binary image data is scan-interleaved. In steps (303) and (304), the base image data 210 and the object image data 220 shown in FIG. 2 are obtained.

In step (305), the base image data 210 is encoded.

In step (306), it is determined whether the object image data 220 has ESD, and encoding is performed differently depending on the result.

In the absence of ESD, an XOR operation is performed on pixel data of the base image data 210 corresponding to the respective pixel data of the object image data 220. Only if the result is "1", the pixel data corresponding to the object image data 220 is encoded, in step (307).

That is, in the absence of ESD, only TSD is encode.

In presence of ESD, all the pixel data of the object image data 220 is encoded, in step (308).

In steps (307) and (308), a specific method for encoding each object pixel to be encoded is expressed as If $(C_{xy}=0)$ Entropy encoding using $P\{0|F(C_{xy})\}$ else if $C_{xy}=1$ Entropy encoding using $P\{1|F(C_{xy})\}$ (1)

$F(C_{xy})=[C_1, C_2, C_3, \ldots, C_n]$ (2)

Here, $(C_{xy})$ is the pixel which is located at [x,y], $F(C_{xy})$ denotes the context of $C_{xy}$ and $P\{0|F(C_{xy})\}$ and $P\{1|F(C_{xy})\}$ is the conditional probability density function.

Figure 4:
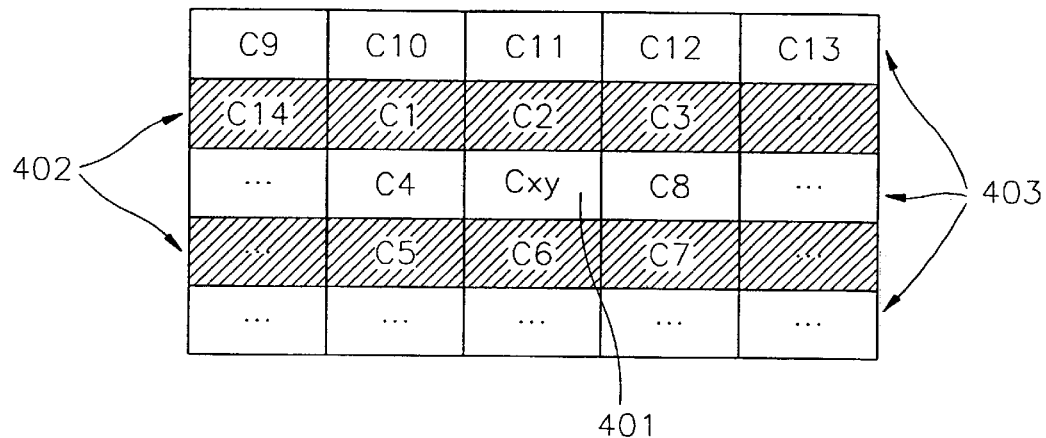
FIG. 4 describes the neighboring pixels for the context value of current pixel.

FIG. 4 illustrates a relationship between an object pixel to be encoded and an adjacent pixel. In FIG. 4, $C_{xy}$ (401) represents a current object pixel to be encoded, and $C_1$–$C_{14}$ represent adjacent pixels. Reference numeral 402 denotes pixels of the base image data 210 and reference numeral 403 denotes pixels of the object image data 220.

In equation (1), $P\{0|F(C_{xy})\}$ and $P\{1|F(C_{xy})\}$ are conditional probability values, when a current corresponding pixel to be encoded is "0" and "1", respectively.

Here, probability information may be made previously or renewed during encoding.

The embodiment of the scan interleaving method according to the present invention shown in FIG. 5 will be described. A scanning direction using scan interleaving can be set to horizontal/vertical or vertical/horizontal. Here, horizontal/vertical scanning is general raster scanning, whereas vertical/horizontal scanning is changed the scanning order of the horizontal/vertical scanning.

Here, changing the scanning direction gives rise to changes in encoding efficiency. In the embodiment of FIG. 5, the numbers of bits generated according to scanning directions are compared, and encoding is performed in the scanning direction generating the smaller number of bits, thus increasing the encoding efficiency.

The method shown in FIG. 5 includes the steps of: (501) receiving binary image data; (502) determining a scan-interleaving direction for the received binary image data; (503) scan-interleaving in the determined direction; (504) obtaining base image data from the scan-interleaved result; (505) obtaining object image data from the scan-interleaved result; (506) encoding the base image data obtained in step (504); (507) determining whether the object image data obtained in step (505) has ESD; (508) encoding TSD only when there is no ESD; and (509) encoding all the data of the object image data (TSD, ESD and PSD) when there is ESD.

The scan interleaving method shown in FIG. 5 will be described as follows.

In step (501), binary image data is received.

Figure 6:
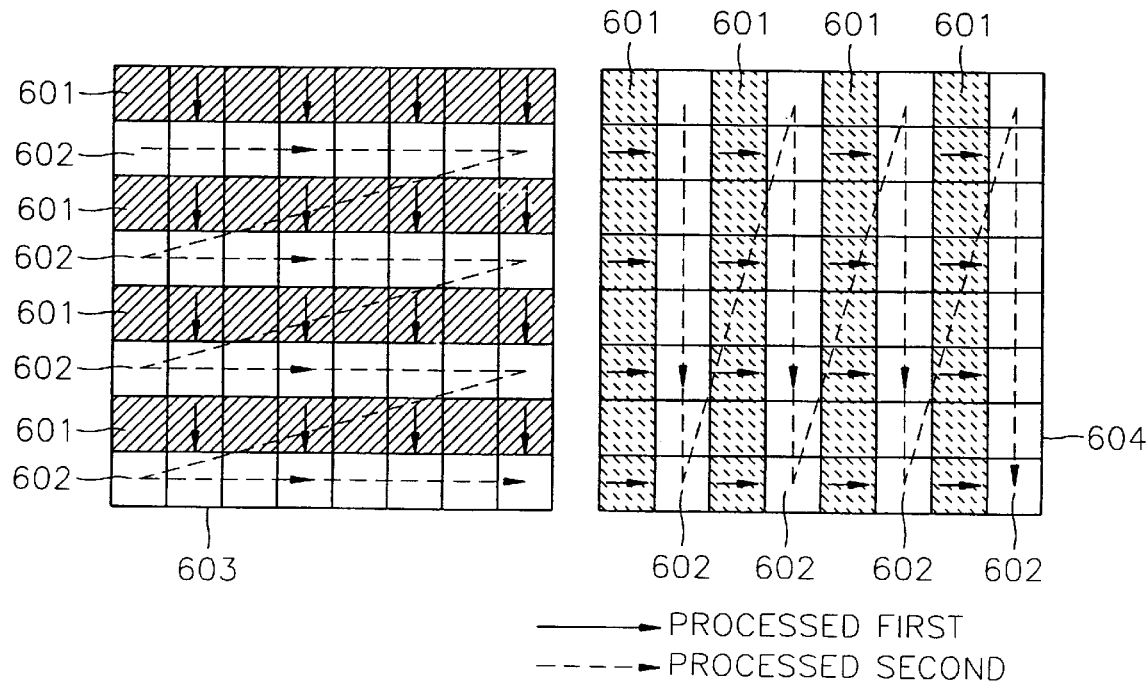
FIG. 6 is referred to when describing a scan interleaving direction determining method in step 502 shown in FIG. 5.

The received binary image data is scan-interleaved in a horizontal/vertical or vertical/horizontal scanning direction as shown in FIG. 6. In FIG. 6, reference numeral 603 denotes an image according to horizontal/vertical scanning, and reference numeral 604 denotes an image according to vertical/horizontal scanning. In both cases, reference numeral 601 denotes the base image data and reference numeral 602 denotes the object image data at second processed case.

The numbers of bits are calculated from the respective encoded results, and a suitable scanning direction is selected according to the following equations, in step (502).

if (the number of bits using vertical/horizontal encoding <the number of bits using horizontal/vertical encoding)

vertical/horizontal scan interleaving else, horizontal/vertical scan interleaving (3)

The encoding method is described at FIG. 3.

In a method relying on equation (3), the scanning direction of which the sum of the scan-interleaved data is the smallest is determined as the scan interleaving direction.

The number of encoded bits=the number of bits of encoded base image data+the bit number of encoded object image data.

if (the number of bits using vertical/horizontal encoding >the number of bits using horizontal/vertical encoding) a horizontal/vertical scan interleaving else, vertical/horizontal scan interleaving (4)

In a method relying on equation (4), the scanning direction of which the sum of the scan-interleaved base image data, object image data is the smallest is determined as a scan interleaving direction.

In step (503), scan interleaving is performed in the determined scan interleaving direction.

The remaining steps (504) through (509) are the same as the steps (303) through (308), respectively, of the method of FIG. 3.

As described above, the algorithm is simplified and system implementation is facilitated, by encoding the TSD and the ESD with PSD in a single structure in the scan interleaving method of the present invention. Thus, the overall encoding performance can be improved. In addition, the numbers of bits depending on scanning direction are compared, thus increasing encoding efficiency.

While the present invention has been illustrated and described with reference to specific embodiments, further modifications and alterations within the spirit and scope of this invention will occur to those skilled in the art.

What is claimed is:

1. A scan interleaving method for obtaining base image data and object image data to be encoding including transitional sampling data (TSD), exceptional sampling data (ESD) and predictive sampling data (PSD) by scan-interleaving binary image data, and encoding the obtained base image data, and object image data which includes TSD, ESD and PSD, comprising the steps of:
   (a) receiving the binary image data;
   (b) scan-interleaving the received binary image data;
   (c) obtaining the base image data from the scan-interleaving result;
   (d) obtaining the object image data from the scan-interleaving result;
   (e) encoding the base image data;
   (f) determining whether the object image data includes ESD;
   (g) encoding TSD only when there is no ESD; and
   (h) encoding TSD, ESD and PSD when there is ESD.

2. The scan interleaving method as claimed in claim 1, wherein said step (g) comprises the sub-steps of:
   (g1) finding context value for a current pixel to be encoded from predetermined neighboring pixel values;
   (g2) obtaining the probability value for the current pixel when the context value is given from said step (g1); and
   (g3) entropy encoding the current pixel with the probability given from said step (g2).

3. The scan interleaving method as claimed in claim 1, wherein said step (h) comprises the sub-steps of:
   (h1) finding context value for a current pixel to be encoded from predetermined neighboring pixel values;
   (h2) obtaining the probability value for the current pixel when the context value is given from said step (h1); and
   (h3) entropy encoding the current pixel with the probability given from said step (h2).

4. A scan interleaving method for obtaining base image data and object image data including transitional sampling data (TSD), exceptional sampling data (ESD) and predictive sampling data (PSD), and encoding the obtained base image data, and object image data which include TSD, ESD and PSD, comprising the steps of:
   (a') receiving the binary image data;
   (b') determining a scan interleaving direction for the received binary image data;
   (c') scan interleaving the received binary data in the determined scan interleaving direction;
   (d') obtaining the base image data from the scan-interleaving result;
   (e') obtaining the object image data from the scan-interleaving result;
   (f') encoding the base image data;
   (g') determining whether the object image data includes ESD;
   (h') encoding TSD only when there is no ESD; and
   (I') encoding the TSD, ESD and PSD when there is ESD.

5. The scan interleaving method as claimed in claim 4, wherein said step (h') comprises the sub-steps of:
   (h'1) finding context value for a current pixel to be encoded from predetermined neighboring pixel values;
   (h'2) obtaining the probability value for the current pixel when the context value is given from said step (h'1); and
   (h'3) entropy encoding the current pixel with the probability given from said step (h'2).

6. The scan interleaving method as claimed in claim 4, wherein said step (i') comprises the sub-steps of:
   (i'1) finding context value for a current pixel to be encoded from predetermined neighboring pixel values;
   (i'2) obtaining the probability value for the current pixel when the context value is given from said step (i'1); and
   (i'3) entropy encoding the current pixel with the probability given from said step (i'2).

7. A scan interleaving method comprising the steps of:
   (a") obtaining base image data and object image data by scan-interleaving binary image data;
   (b") obtaining transitional sampling data (TSD), exceptional sampling data (ESD) and predictive sampling data (PSD) if any, for the object image data;
   (c") determining whether the object image data includes ESD; and
   (d") encoding the base image data and the TSD when there is no ESD, and encoding the base image data, the TSD, ESD and PSD when there is the ESD.

8. The scan interleaving method as claimed in claim 7, wherein the step (a") comprises the substeps of:
   (a"1) scan-interleaving binary image data in a horizontal-and-then-vertical scanning order and a vertical-and-then-horizontal scanning order; and
   (a"2) selecting the scan-interleaved result in either of the scanning order which produces the smallest number of bits upon encoding the scan-interleaved result.

9. The scan interleaving method as claimed in claim 8, wherein in the step (a"2), the numbers of bits of the encoded data or produced by each scanning order are compared.

10. The scan interleaving method as claimed in claim 8, wherein in the step (a"2), the numbers of bits of the base image data, and or produced by each scanning order are compared.

11. The scan interleaving method as claimed in claim 7, wherein said step (d") comprises the sub-steps of:
   (d"1) finding context value for a current pixel to be encoded from predetermined neighboring pixel values;
   (d"2) obtaining the probability value for the current pixel when the context value is given from said step (d"1); and
   (d"3) entropy encoding the current pixel with the probability given from said step (d"2).

* * * * *